(12) United States Patent
Turer et al.

(10) Patent No.: US 6,447,413 B1
(45) Date of Patent: Sep. 10, 2002

(54) FIELD SERVICEABLE DERAILLEUR DEVICE

(76) Inventors: Eric S. Turer, 157 River St., Rochdale, MA (US) 01542; Thomas J. Malay, 18 Hampton Rd., Exeter, NH (US) 03833

( * ) Notice: Subject to any disclaimer, the term of this patent is extended or adjusted under 35 U.S.C. 154(b) by 0 days.

(21) Appl. No.: 09/240,827

(22) Filed: Feb. 1, 1999

(51) Int. Cl.[7] .............................. F16H 63/34; F16D 9/04

(52) U.S. Cl. .............................. 474/80; 403/2; 403/19; 403/300

(58) Field of Search .............................. 403/2, 299, 19, 403/300, 305, 307, 343

(56) References Cited

U.S. PATENT DOCUMENTS

| | | | | |
|---|---|---|---|---|
| 4,166,939 A | * | 9/1979 | Switzer | 403/DIG. 1 X |
| 4,731,045 A | * | 3/1988 | Nagano | 474/80 X |
| 4,850,940 A | * | 7/1989 | Nagano | 474/80 |
| 5,494,307 A | * | 2/1996 | Anderson | 474/80 X |
| 5,553,960 A | * | 9/1996 | Turer et al. | 403/2 |
| 5,916,267 A | * | 6/1999 | Tienboon | 623/17 |
| 5,931,753 A | * | 8/1999 | Ichida | 474/80 X |

FOREIGN PATENT DOCUMENTS

EP        638752    *   2/1995

* cited by examiner

Primary Examiner—David A. Bucci
Assistant Examiner—Marcus Charles

(57) ABSTRACT

A field serviceable device in conjunction with a pivoting means and a stationary means, such as a bicycle derailleur and a derailleur hanger, respectively. The device comprises a head, a barrel, a flange, and a pin. The barrel comprises a barrel-flange connector and barrel-pin connector on a first end, and a barrel-head connector on a second end. The head, flange, and pin are independently connected to the barrel. The pin has a pin-tool opening extending through the pin, and the barrel has a barrel-tool opening of sufficient dimension extending through the barrel such that a pin tool can extend into the barrel-tool opening without interference. The pin further defines a pin fracture notch that is designed to fracture before the pivoting means or stationary means is damaged due to a force applied to the pivoting means or stationary means by debris impacting the pivoting or stationary means or becoming wedged between, for example, the bicycle frame and the derailleur. The pin is designed such that the fractured pin is easily removed and replaced, without releasing the pivoting means from the head, barrel, and flange, thereby restoring the functionality of the pivoting and stationary means.

20 Claims, 2 Drawing Sheets

FIELD SERVICEABLE DERAILLEUR DEVICE

BACKGROUND OF THE INVENTION

Mountain biking, a branch of the bicycle industry that has become increasingly popular, has evolved to provide off-road equipment for transportation, racing, and recreation. A derailleur assembly (i.e., the mechanism used to switch gears) of a bike often disables when an object, such as a stick or rock, impacts the derailleur or becomes wedged between the derailleur and the frame or the wheel of the bicycle. Damage to the frame, the derailleur, or the derailleur hanger almost always results. As a result of the damage to the derailleur assembly, the bike becomes disabled, leaving the rider stranded. With the limitation on weight and space, it is impractical for a rider to carry sufficient spare parts or tools to repair the damaged derailleur assembly at the site. The repairs, if possible, will be costly and time consuming.

Two traditional designs are used to attempt to protect the bicycle frame from becoming damaged. These designs are incorporated between the derailleur and the bicycle frame. The designs are structural weak links so as to deform or break rather than allowing the bicycle frame or derailleur to be damaged. These designs include a deformable derailleur hanger and a mounting bolt of softer material than that of the bicycle frame and/or derailleur. A deformable derailleur hanger protects the frame, but does not extend to preserving the derailleur. A softer mounting bolt has a tendency to flex excessively under reasonable loading. By protecting the bicycle frame or derailleur, both of these designs render the bicycle disabled and make field repair impracticable.

Another field serviceable derailleur device similar to the present invention requires exact alignment between three internal tool opening surfaces having the same cross-sectional area and shape. This field serviceable derailleur device requires careful production and installation.

SUMMARY OF THE INVENTION

The problem with requiring exact alignment with three internal tool opening surfaces so that the designed shear point is not stressed during installation is that there are numerous manufacturing difficulties. These difficulties are eliminated in the current invention by using a separate set of actuating features for two of the parts that do not interfere with the actuation of the third and by reducing the number of internal connections required. Additionally, this revision eliminates the need to precisely set the depth of the tool during installation and removal of the device. Finally, the previous device was highly sensitive to the torque with which the device was installed, leading to variability in the force required to fracture the pin, thereby making the device prone to premature pin fracture. The current invention employs a depth stop to control the torque loads applied to the device during installation.

The present invention is generally directed to bicycle derailleurs, specifically a device to protect the derailleur and derailleur hanger of a bicycle from being damaged and allowing for field serviceability.

In general, according to one aspect, the invention apparatus concerns a field serviceable device that reduces the likelihood of damaging a pivoting means, such as a bicycle derailleur, and stationary means, such as a bicycle derailleur hanger. The device comprises a head, a barrel, a flange, and a pin. The barrel comprises a barrel-head connector at a first end and a barrel-flange connector at a second end. The head comprises a head-barrel connector whereby the head and barrel are connected by mating the head-barrel connector of the head and the barrel-head connector of the barrel. The flange comprises a flange-barrel connector, whereby the head and flange are connected by mating the head-flange connector of the head and the flange-head connector of the flange. The pin comprises a pin-barrel connector on a first end, a pin mounting connector on a second end, and a pin fracture notch between the first and second end of the pin. The pin and head are connected by mating the pin-barrel connector of the pin and the barrel-pin connector of the barrel. The pin further comprises a pin-tool opening extending through the pin, whereby a tool is inserted into the pin. The barrel further comprises a barrel-tool opening extending through the barrel. The head further comprises a head-tool opening extending through the head. Both the barrel-tool and head-tool openings are of sufficient dimension so that the pin-tool is not interfered with when rotating the pin.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principals and features of this invention may be employed in various and numerous embodiments without departing from the scope of the invention.

BRIEF DESCRIPTION OF THE DRAWINGS

In the drawings, like reference characters refer to the same parts throughout the, different views. The drawings are not necessarily to scale, emphasis instead being placed upon illustrating principles of the invention.

DETAILED DESCRIPTION OF THE PREFERRED EMBODIMENTS

Figure 1:
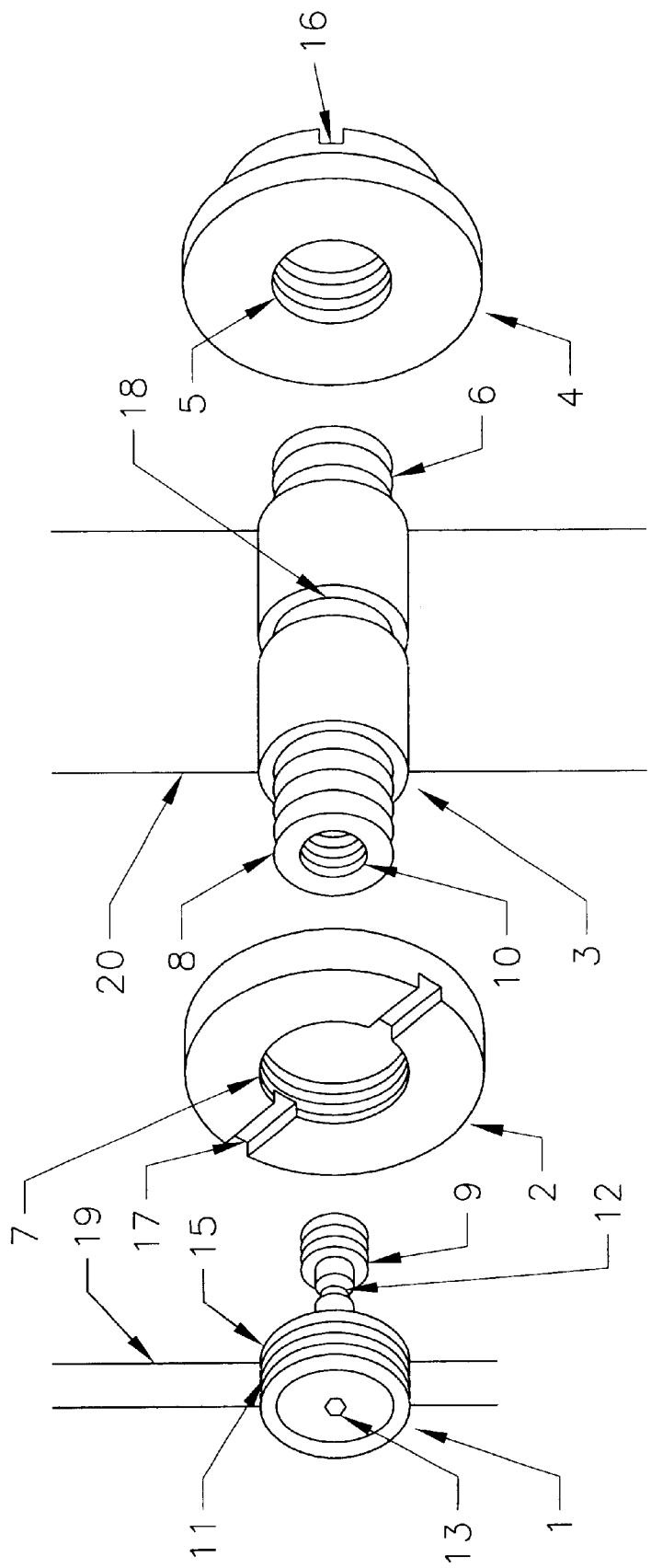
FIG. 1 is an exploded perspective view of the derailleur device.

FIG. 1 shows a device that has been constructed according to the principles of the present invention. FIG. 1 shows a pin 1, a flange 2, a barrel 3, and a head 4 shown in perspective to demonstrate how the device is assembled. The head 4 is connected to the barrel 3 using a head-barrel connector 5 of the head 4 and a barrel-head connector 6 of the barrel 3. The flange 2 is connected to the barrel 3 using a flange-barrel connector 7 of the flange 2 and a barrel-flange connector 8 of the barrel 3.

In a preferred embodiment, the connections between these parts is accomplished using compatible male threads on the barrel 3 and female threads on the head 4 and flange 2. In the preferred embodiment, the female threads do not require internal thread stops. However, other embodiments provide methods of attachment (not shown) to connect the head 4 and flange 2 to the barrel 3. In an alternate embodiment, the head 4 is permanently attached to the barrel 3 to form a combined part. In a further embodiment, the flange 2 is permanently attached to the barrel 3 to form a combined part. Combining these parts minimizes the number of parts that are required to be threaded.

The pin 1 connects to the barrel 3 using a pin-barrel connector 9 of the pin 1 and a barrel-pin connector 10 of the barrel 3. In the preferred embodiment, the connections between these parts is accomplished using compatible male threads on the pin 1 and female threads on the barrel 3.

However, other methods of attachment can be used to connect the pin 1 to the barrel 3.

The pin 1 has a pin mounting connector 11 at the opposite end from the pin-barrel connector 9. This pin mounting connector 11 is depicted as a standard thread pitch which allows the device to be attached to most current derailleur hangers in the preferred embodiment. In an alternate embodiment, the pin mounting connector is modified to allow the device to be used with other derailleur hanger designs. The connections at the head-barrel and flange-barrel junctions are depicted as using a 'clockwise' thread pitch, and the head pin junction is depicted as using a 'counter-clockwise' (reverse) thread pitch such that both junctions remain connected (do not back-out) when the pin mounting connector 11 is screwed into a derailleur hanger (stationery means) 19. Again, other methods of attachment can also be used which would prevent the junctions from loosening when the device is installed in a derailleur hanger 19.

Continuing to refer to FIG. 1, the pin 1 defines a notch 12, which produces an area of minimum cross-section between the pin mounting connector 11 and the pin-barrel connector 9. This area is designed to provide sufficient strength to maintain the connection between the derailleur (pivoting means) 20 and the derailleur hanger 19 under normal use, but also to create a precise location where the pin 1 fractures under the excessive forces produced when a foreign object impacts the derailleur or becomes wedged between the derailleur 20 and the bicycle frame or wheel. The above mentioned fracture leaves the pin mounting connector 11 in the derailleur hanger, and the pin-barrel connector 9 in the barrel 3. To allow easy removal of these parts of the fractured pin 1, the pin 1 further comprises a pin-tool opening 13 that extends through the notch 12, such that both of the shear faces of the fractured pin expose a tool opening into which a pin-tool is inserted. The hexagonal shape of the pin-tool opening 13 is for demonstrational purposes only, and can be any shape.

Direct actuation of the entire length of the pin 1 in the installation of the device prevents inducing large torsional stresses across the notch 12.

Figure 2:
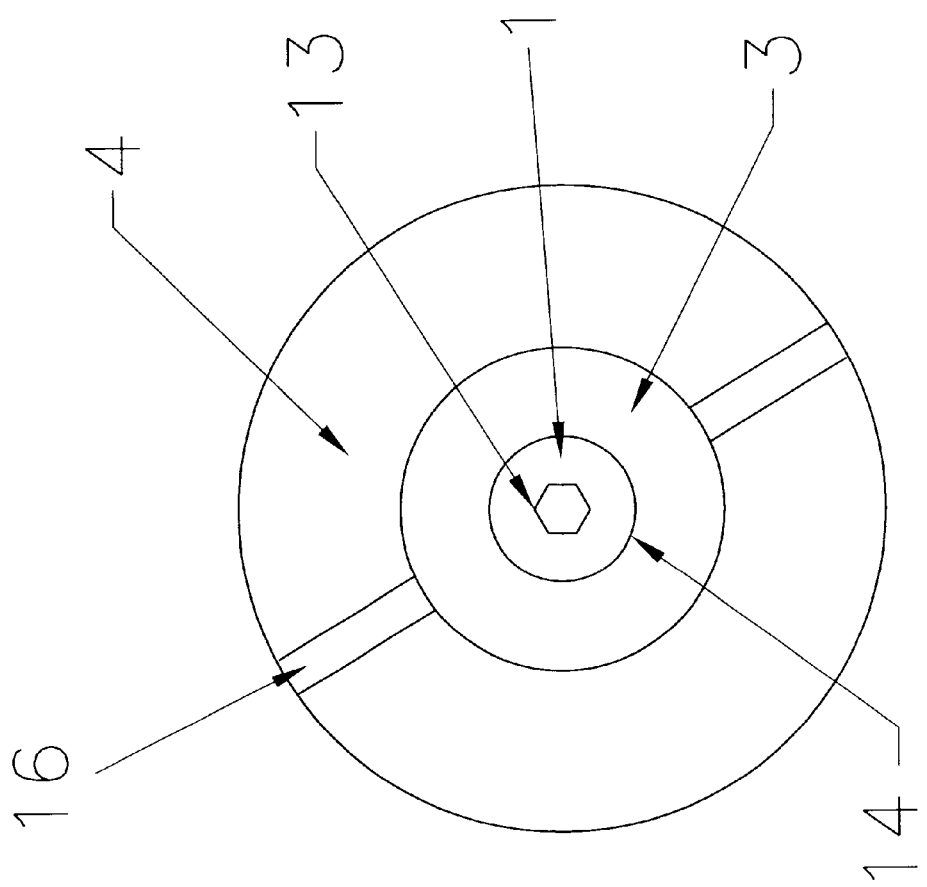
FIG. 2 is an end view of the derailleur device.

FIG. 2 shows a view from the head 4 end of the device when assembled. A barrel-tool opening 14 extends through the barrel 3, which permits a tool, inserted from the barrel-head connector 6 end of the barrel 3, to access the pin-tool opening 13 of the pin 1. Note that the barrel-tool opening 14 is designed to guide a tool into the pin-tool opening 13 without interfering with the insertion or rotation of the tool (i.e., the barrel-tool opening 14 is larger than the pin-tool opening 13). This design eliminates the need to precisely align tool opening surfaces to allow access to the pin tool opening, and allows the pin tool to turn freely when installing or removing the pin 1 into or out of the barrel 3, respectively, even if this tool extends beyond the pin 1 into the barrel 3.

Referring back to FIG. 1, incorporated into the pin mounting connector 11 is a pin depth stop 15, accomplished by a stop in the threads. The depth stop prevents excessive pre-loading (tensile stress) of the notch 12 by over-tightening the device into the derailleur hanger, which can lead to premature pin fracture.

In FIG. 1, a head actuating tool feature 16 in the head 4, accepts a tool to be used in tightening the head 4 onto the barrel 3 when the device is initially installed. The flange 2 incorporates a flange actuating tool feature 17 to be used in tightening the flange 2 onto the barrel 3 when the device is initially installed. Both the head actuating tool feature 16 and the flange actuating tool feature 17 are shown as slots that accept a flat head screw driver or spanner wrench. Alternatively, any other geometric shape can be used, including a raised surface, such as a wing, so that the head 4 and flange 2 is hand or tool tightened. Although the head 4 and flange 2 are shown in FIG. 1 as having a circular shape, in an alternate embodiment, both have alternative geometric shapes, such as hexagonal or square. These alternative shapes allow for installation using standard tools, such as a ratchet or wrench.

A further purpose of the head actuating tool feature 16 is to oppose the force of the pin tool in the pin-tool opening 13 when the pin 1 is being installed and the fractured pin is being removed.

FIG. 1 further shows the head 3 containing an o-ring groove 18, which accepts, for example, a rubber o-ring present in many standard derailleur mounting bolts. In other embodiments, O-rings comprised of different materials are used, such as plastic, nylon or other natural or synthetic compounds.

Another benefit of the derailleur device includes isolating the permanent nature of the head-barrel-flange connection from the replaceable nature of the barrel-pin connection, thereby preventing the need to manually maintain the head-barrel-flange connection when the fractured pin is removed.

While this invention has been particularly shown and described with references to preferred embodiments thereof, it will be understood by those skilled in the art that various changes in form and details may be made therein without departing from the spirit and scope of the invention.

What is claimed is:

1. A device in combination with a pivoting means and a stationery means for reducing damage to the pivoting means and stationary means, the device comprising:

a head comprising a head-barrel connector;

a flange comprising a flange-barrel connector;

a pin comprising a first end and a second end, said pin having a pin-barrel connector at said first end and a pin mounting connector at said second end and a pin fracture notch between said first and said second ends, said pin is connected to said barrel by mating said pin-barrel connector to said barrel-pin connector, and said pin is removably connected to said stationary means by said pin mounting connector, said pin further comprising an outer wall and an inner wall, wherein said inner wall defines a pin-tool opening extending through said pin, so as to be actuated by a tool, said pin also comprising a depth stop, such that an interaction between said depth stop and said stationery means by said pin mounting connector establishes a desired insertion depth on said pin during installation to prevent excessive preloading of the pin when the flange is in contact with the stationery means; and a barrel comprising a first and a second end, the barrel having a barrel-head connector at a first end and a barrel-flange connector and a barrel-pin connector at the second end, said head is connected to the barrel by mating barrel-head connector to the head-barrel connector, the flange is connected to the barrel by mating the barrel-flange connector to the flange-barrel connector, the pivoting means is retained between the head and the flange, the barrel further comprising an outer wall and an inner wall, wherein the inner wall defines a pin-tool access opening extending through the barrel, wherein the pin-tool access opening is dimensioned such that it does not interfere with an insertion or rotation of the pin tool inserted through the pin-tool access opening and into the pin-tool opening.

2. The device as in claim 1, wherein said pivoting means comprises a derailleur and said stationary means comprises a derailleur hanger.

3. The device as in claim 1, wherein said head and said barrel are a single, combined unit.

4. The device as in claim 1, wherein said flange and said barrel are a single, combined unit.

5. The device as in claim 1, wherein said head, said barrel, and said flange are permanently attached to enclose the pivoting means.

6. The device as in claim 1, wherein said pin has an outer wall and at least a portion of said first end and said second end of said pin has an inner wall, wherein said portions of said pin having an inner wall defines a pin tool opening having a geometric shape to accept a tool for rotating said pin and said pin tool opening extending axially into said pin, having length and location to ensure that when said notch of said pin fractures, a tool can be inserted independently into either said first or said second end of said pin.

7. The device as in claim 1, wherein said barrel has an outer wall and an inner wall, wherein said barrel inner wall defines a barrel-tool opening extending through said barrel.

8. The device as in claim 7, wherein said barrel-tool opening is of sufficient dimension so that it does not interfere with an insertion or rotation of a pin tool inserted through said barrel-tool opening and into said pin-tool opening.

9. The device as in claim 7, wherein said barrel-tool opening has a geometric shape to accept a tool for rotating said barrel.

10. The device as in claim 1, wherein said head further comprises head tool actuating features.

11. The device as in claim 10, wherein said head tool actuating features comprise an opening, said opening defining a geometric shape to accept a tool for actuating the head when connecting and disconnecting said head and said barrel.

12. The device as in claim 10, wherein said head tool actuating features define a raised surface extending substantially axially outward from said head to allow a thumb and forefinger to grip said raised surface to actuate the head when connecting and disconnecting said head and said barrel.

13. The device as in claim 10, wherein said head-tool actuating features define a head of a geometric shape, said geometric shape enabling a tool to actuate the head, thereby facilitating connecting and disconnecting said head and said barrel.

14. The device as in claim 1, wherein said flange further comprises flange tool actuating features.

15. The device as in claim 14, wherein said flange tool actuating features define an opening, said opening defining a geometric shape to accept a tool for actuating the flange when connecting and disconnecting said flange and said barrel.

16. The device as in claim 14, wherein said flange tool actuating features define a raised surface extending substantially axially outward from said flange to allow a thumb and a forefinger to grip said raised surface to actuate the flange to connect and disconnect said flange and said barrel.

17. The device as in claim 14, wherein said flange tool actuating features comprise a flange of a geometric shape, said geometric shape enabling a tool to actuate said flange to connect and disconnect said flange and said barrel.

18. The device as in claim 1, wherein said pin mounting connector comprises a depth stop, wherein an interaction between said depth stop and said stationary means establishes a desired insertion depth on said pin to prevent excessive preloading of said pin during installation when said flange is in contact with said stationary means.

19. The device as in claim 1, wherein said pin-barrel connector comprises a contacting means, wherein said barrel and said pin maintain contact when said device is installed into the stationary means.

20. The device as in claim 19, wherein said pin mounting connector attaches to said stationary means using compatible screw threads, and said contacting means comprise threads of a reverse pitch to those of the pin mounting connector.

* * * * *